Dec. 24, 1968  J. M. SCHAEFER  3,418,557
VOLTAGE CONTROL SYSTEM INVOLVING TIMED
ENERGIZATION OF A PAIR OF POWER
HANDLING TRANSISTORS

Filed March 2, 1966  6 Sheets-Sheet 2

FIG. 2

INVENTOR.
JOHANNES M. SCHAEFER

BY
James and Franklin
ATTORNEY

J. M. SCHAEFER 3,418,557

VOLTAGE CONTROL SYSTEM INVOLVING TIMED
ENERGIZATION OF A PAIR OF POWER
HANDLING TRANSISTORS

Filed March 2, 1966

INVENTOR.
JOHANNES M. SCHAEFER

BY *James and Franklin*

ATTORNEY

Dec. 24, 1968   J. M. SCHAEFER   3,418,557
VOLTAGE CONTROL SYSTEM INVOLVING TIMED
ENERGIZATION OF A PAIR OF POWER
HANDLING TRANSISTORS
Filed March 2, 1966   6 Sheets-Sheet 6

INVENTOR.
JOHANNES M. SCHAEFER

BY *James and Franklin*

ATTORNEY

United States Patent Office 3,418,557
Patented Dec. 24, 1968

3,418,557
VOLTAGE CONTROL SYSTEM INVOLVING TIMED ENERGIZATION OF A PAIR OF POWER HANDLING TRANSISTORS
Johannes M. Schaefer, Wilton, Conn., assignor to Technipower Incorporated, Norwalk, Conn., a corporation of Connecticut
Filed Mar. 2, 1966, Ser. No. 531,286
8 Claims. (Cl. 321—18)

ABSTRACT OF THE DISCLOSURE

A voltage control circuit in which a sawtooth voltage is generated at a predetermined frequency that voltage acting on a flip-flop circuit to render one or the other of a pair of power handling transistors potentially conductive, said sawtooth voltage being compared with a signal derived from an output parameter so as to produce a switching signal at a point in each cycle of the sawtooth voltage determined by that output parameter, the switching signal being ineffective on that one of the power handling transistors which is not potentially conductive and being effective on that one of the power handling transistors which is potentially conductive so as to cause that power handling transistor to become actually conductive, that power handling transistor remaining conductive only for so long as the flip-flop circuit continues to render it potentially conductive.

---

The present invention relates to a voltage control system having a DC output, and in particular to one providing a high degree of accuracy and flexibility of control over an exceptionally wide voltage and power output range.

Transistorized power supplies offer many advantages in compactness and in accuracy and facility of control of the voltage and/or current output thereof. They suffer, however, from limitations on their voltage output and power handling capacity. In the case of systems provided with a DC input where voltage stepup is required, they often suffer from a lack of efficiency. As a result, when high voltages or currents are to be handled, the size and weight of the power supplies must be increased, thereby negating to an appreciable extent the advantages inherent in the use of transistor circuitry. In addition, transistors having a large current-carrying capacity must be employed, thus adding appreciably to the cost of the overall units.

Moreover, when such units are so designed as to automatically maintain an output parameter (e.g. voltage) at a predetermined value, difficulty has been experienced in providing the desired degree of accuracy and speed of response.

The prime object of the present invention is to devise a power supply system which will avoid the above mentioned drawbacks, and which will in particular be capable of producing outputs the voltage and power contents of which can vary over a wide range while at the same time utilizing simple, inexpensive and reliable transistors throughout. Further, efficiency of power transmission and the effectiveness and accuracy of the voltage and/or current control exhibited by the system will be maximized.

The primary limiting fact in the power-handling capacity of a transistorized power supply resides in those transistors through which the output power must pass. The heat-dissipating characteristics of transistors are limited, and the heat produced in them which must be dissipated is determined by the current passing through them. In accordance with the system of the present invention, the power-handling transistors are operated at a comparatively high voltage (e.g., a line voltage of 110 volts), and consequently a relatively low current passes therethrough, thus minimizing the heat produced therein. This is entirely independent of the output of the system, which may, if desired, be at a low voltage and high current.

The input portion of the system, where the power-handling transistors are located, must be isolated from the output portion of the system. This isolation is achieved in part by means of a transformer. If the transformer were to be operated at a conventional line frequency of sixty cycles per second it would be inefficient, and would have to be comparatively large and heavy. In accordance with the present invention, the transformer is operated at a frequency independent of the line input frequency and considerably higher than the latter, for example, in the kilocycle per second range. Hence its size and weight are minimized.

The input to the system of the present invention is essentially DC. This may come from a raw DC source or it may come from a rectified AC source. In order to permit isolation between the input and output sections, and also in order to produce an output voltage which differs from the input voltage, the DC voltage is inverted via the isolating transformer. Inversion, in and of itself, is conventional. Thus, the DC input is shifted from one end of the primary winding of the transformer to the other by a pair of power-handling transistors operated in switching mode, thereby producing in the secondary winding of the transformer an alternating voltage which is subsequently rectified. In accordance with the present invention, the switching from one transistor to the other is accomplished at any desired frequency, entirely independent of the line frequency (if the input is derived from an AC line), and may be in the kilocycle per second range. Because the frequency of the switching cycle is chosen to be at a relatively high value, the transformer is operated at said high frequency and therefore may be smaller and lighter than would be the case were it operated at normal power frequencies.

In addition, voltage control and regulation is achieved by controlling in particular fashion the length of time that each of the switching transistors is on. First one switching transistor is turned on and off, then there is an interval when both switching transistors are off, and then the second switching transistor is turned on and off, usually followed again by an interval when both transistors are off before the first transistor is again turned on. The relative time durations of transistor-on periods and both-transistors-off periods determines the output voltage; the shorter the "off" period, the higher is the output voltage.

Control of the switching transistors is achieved in the present system in a novel fashion. A timing circuit sets the basic cycle frequency and, within that cycle, renders the switching transistors alternatively potentially active. Other circuitry compares the output voltage or other parameter to be controlled with a predetermined signal and, in accordance with that comparison, controls the instants when each of the switching transistors, while it is potentially active, is turned on and off. In the form here specifically disclosed a sawtooth voltage of appropriate frequency is generated, that voltage actuating a flip-flop circuit which in turn controls which of the switching transistors is potentially active at a given instant. A sawtooth voltage signal is compared with the output parameter and produces a comparison signal which in turn actuates whichever one of the switching transistors is potentially active at a given time so as to determine the instants when that transistor is turned on and off.

The signal corresponding to the output parameter with which the sawtooth voltage signal makes comparison is here derived in a particularly effective fashion, one which provides for accurate and rapid control of the switching transistors in response to the sensing of the output parameter, and which provides for effective isolation between the sensed output (on the secondary side of the transformer) and the controlled input (on the primary side of the transformer). To this end the sensing is accomplished by a multivibrator circuit designed to produce an essentially square wave output which, except under nominal conditions, is unsymmetrical. The degree and direction of asymmetry, when compared with a nominal condition of symmetry, produces a DC signal the value of which will be correspondingly above or below nominal value. It is this DC signal which is compared with the sawtooth voltage, and the level of this DC signal determines when, within each appropriate cycle, the corresponding switching transistor is turned on and off.

To the accomplishment of the above, and to such other objects as may hereinafter appear, the present invention relates to a voltage control system as defined in the appended claims and as described in this specification, taken with the accompanying drawings in which:

GENERAL SYSTEM DESIGN

Figure 1:
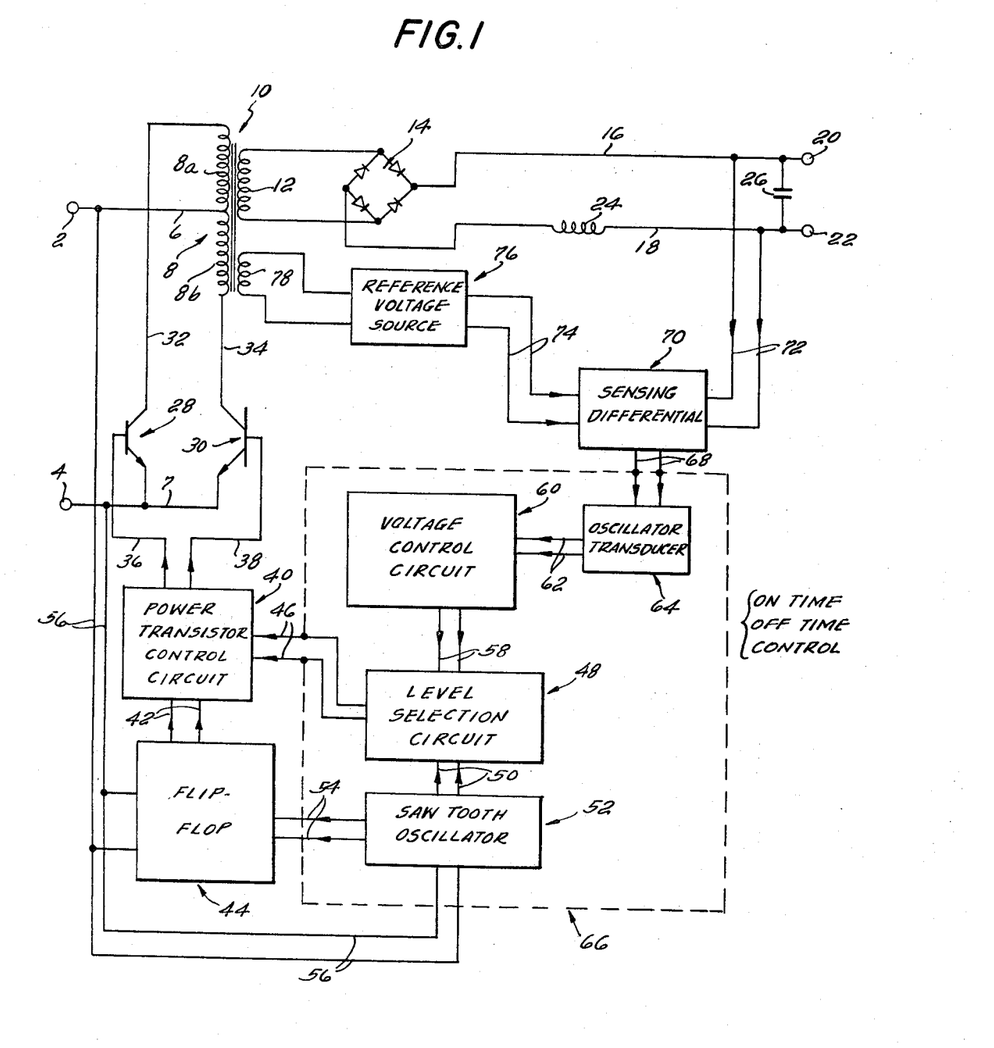
FIG. 1 is a block diagram of one embodiment of the system of the present invention.

FIG. 1 is a circuit diagram, primarily in block diagram form, of a preferred embodiment of the present invention in which the novel voltage control system here disclosed, utilizing inversion plus control of the on-off times of the inverting switches, provides substantially the sole control for the desired output parameters. A DC input is applied across terminals 2 and 4. If an AC power source is available, any appropriate rectifier may be utilized in advance of terminals 2 and 4 to convert it to DC. The terminal 2 is connected by lead 6 to the midpoint of the primary winding 8 of a transformer 10, the primary winding 8 being divided into upper and lower winding sections 8a and 8b respectively. The transformer 10 has a secondary winding 12 which is connected across a pair of opposed terminals of a full wave rectifying bridge 14, the other pair of opposed terminals of the bridge 14 being connected by leads 16 and 18 to the output terminals 20 and 22 respectively. A filter comprising a series inductance 24 and shunt capacitance 26 may be provided to smooth the DC output.

A pair of power-carrying switching transistors 28 and 30 have their collectors connected by leads 32 and 34 respectively to the ends of the primary winding sections 8a and 8b respectively. The emitters of the transistors 28 and 30 are connected to one another and to the DC input terminal 4 by lead 7. The bases of the transistors 28 and 30 are connected by leads 36 and 38 respectively to a power transistor control circuit generally designated 40. The circuit 40 determines which of the transistors 28 and 30 is potentially conductive at any given time and, within the period that it is potentially conductive, when it is conductive ("on") and when it is not conductive ("off"). As will be apparent from FIG. 1, when transistor 28 is on, current will flow through the primary winding section 8a inducing a voltage in the secondary winding 12; when the transistor 30 is on current will flow through the primary winding section 8b, inducing a voltage in the secondary winding 12 which is similar to but opposite in sense from that produced when the transistor 28 is on.

The power transistor control circuit 40 has a first input, represented by the lines 42, from a flip-flop circuit 44'. The flip-flop circuit 44 has two statuses, each status rendering a different one of the power transistors 28, 30 potentially conductive and rendering the other power transistor 30, 28 non-conductive. The power transistor control circuit 40 has a second input, represented by the lines 46, from a level selection circuit 48. It is the input 46 from the level selection circuit 48 which determines precisely when each of the switching transistors 28 and 30, having the period that it is potentially conductive, is in fact rendered conductive. Thus the input 42 from flip-flop circuit 44 provides the inversion of the DC input, and the input 46 from the level selection circuit 48 determines the relative proportions of off-time and on-time, thereby determining the magnitude of the controlled output parameter—the longer the transistors 28 and 30 are on when compared with the period of time that they are off, the greater will be the magnitude of the output parameter.

When, as is here specifically disclosed, it is desired that the output parameter be maintained substantially constant, the magnitude and nature of the output 46 from the level selection circuit 48 is determined by a comparison between the output parameter to be regulated and some appropriate reference signal. As here specifically disclosed the reference signal, designated by the lines 50, is derived from a sawtooth oscillator circuit 52, that circuit 52 also having an output 54 which feeds into the flip-flop circuit 44 and controls, in accordance with the frequency of the sawtooth oscillator output 54, the frequency of shifting of the flip-flop circuit 44 from one status to another. Both the flip-flop circuit 44 and the sawtooth oscillator circuit 52 are powered from the DC input 2, 4 over the leads 56. The signal which is compared with the output 50 of the sawtooth oscillator 52, and which is representative of the magnitude of the output parameter to be controlled, is represented by the lines 58 which come from a voltage control circuit 60, which in turn has an input 62 from an oscillator transducer circuit 64. The circuits 48, 52, 60 and 64, enclosed within a broken line, may be considered to represent in combination the on-time, off-time control 66 for the system. The input thereto, represented by the lines 68, is derived from a sensing differential circuit 70 which compares inputs 72 and 74, the former being representative of the output parameter to be controlled and the latter being a reference signal. As disclosed in FIG. 1 the input 72 is derived across the output leads 16 and 18, therefore being representative of the output voltage parameter. The input 74 is derived from a reference voltage source 76 which is powered from winding 78, which may be a separate secondary winding on the transformer 10, or from any other source.

Figure 2:
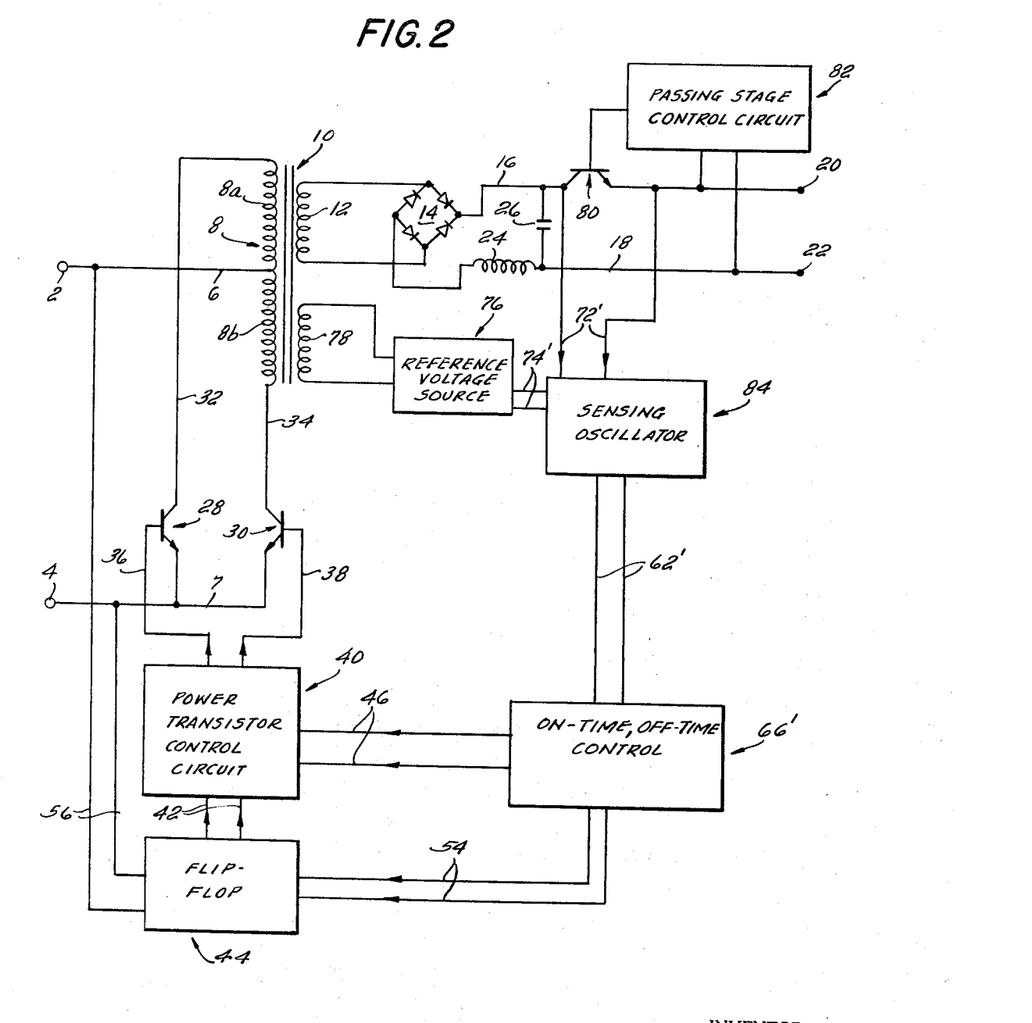
FIG. 2 is a block diagram of an alternative embodiment of the present invention in which additional regulating control is provided by a conventional passing transistor.

In the embodiment of FIG. 1 the sensing differential 70 and the oscillator transducer 64 are separate circuits each designed to perform their required function—a high degree of control accuracy and speed of response in order to provide output voltage control of desired quality—without any external assistance. In the embodiment of FIG. 2, on the other hand, some regulation of the output parameter is achieved, in known fashion, by means of the passing transistor 80 located in the output line 16, and which is provided with its own passing stage control circuit 82. Under those circumstances the sensing differential 70 and oscillator-transducer 64 of the embodiment of FIG. 1 may conveniently be combined into a single sensing oscillator circuit 84 which compares an input 72' representative, for example, of the voltage across the passing stage (which is to be maintained at a minimum value regardless of the output voltage of the supply) with an input 74' derived from reference voltage source 76, and which has an output 62' which goes to and controls the on-time, off-time control 66' which is similar to the on-time off-time control 66 of FIG. 1 except for the absence of the separate oscillator-transducer circuit 64.

The sensing differential circuit 70 senses and emphasizes the difference between the reference voltage input 74 and the parameter-controlled input 72 and sends its output 68 to the oscillator-transducer circuit 64. The circuit 64 is designed to produce a square wave alternating voltage signal 62 which is nominally symmetrical and therefore equally negative and positive (FIG. 8A), but which becomes unsymmetrical either in a more negative sense (FIG. 8B) or a more positive sense (FIG. 8C) depending upon whether the input 68 indicates a lowered or increased output parameter when compared with the nominal value thereof. The voltage control circuit 60 converts the square wave alternating signals 62 of FIGS. 8A–C to a DC signal 58 corresponding thereto and illustrated in FIGS. 9A–C, FIG. 9A representing the DC signal corresponding to nominal output, FIG. 9B representing the more negative DC signal corresponding to lowered output and FIG. 9C representing the more positive DC signal corresponding to increased output.

Figure 10:
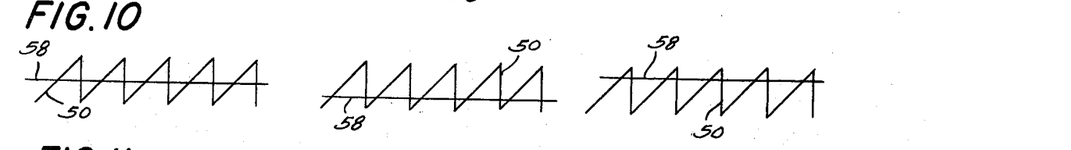
Figure 11:
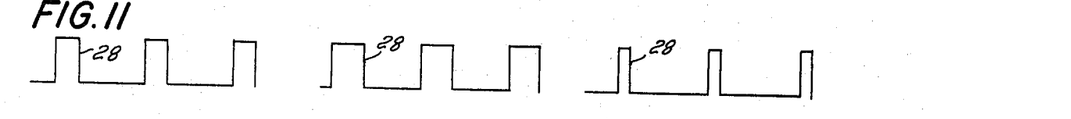
Figure 12:
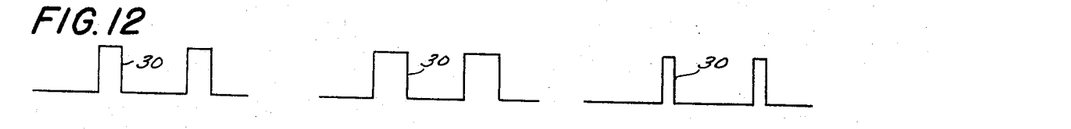
Figure 13:
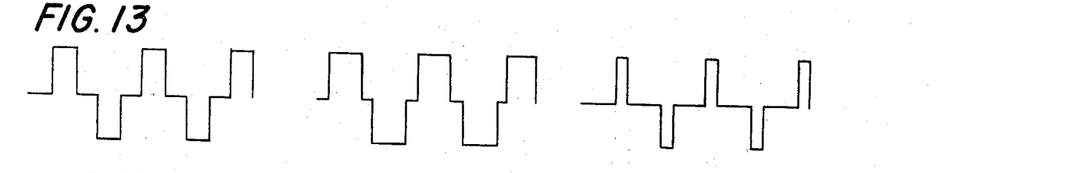
Figure 14:
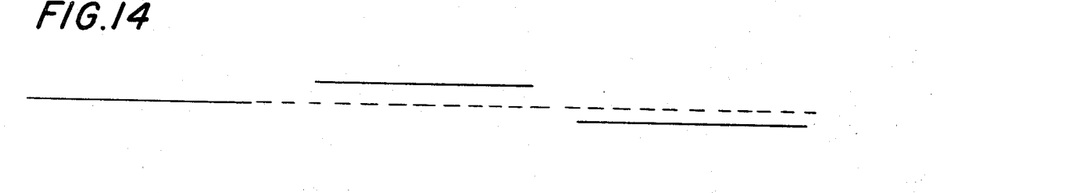

FIGS. 10A–C illustrate the action of the level selection circuit 48. The sawtooth input signal 50 is compared with the signal 58. At the same time, each sawtooth changes the status of the flip-flop circuit 44, thereby rendering first one and then the other of the power transistors 28 and 30 potentially conductive. Actual conduction of the potentially conductive power transistor 28 or 30 is controlled by the output 46 which is present whenever the sawtooth signal 50 of FIGS. 10A–C is at a higher potential than the DC signal 58. FIGS. 11A–C represent current through the power transistor 28, while FIGS. 12A–C represent current through the power transistor 30, FIGS. 13A–C are idealized representations of the current flowing in the secondary winding 12, and FIGS. 14A–C represent the resultant effect on the output voltage.

As is shown in FIGS. 10A–14A, when the output voltage is at nominal value the signal 58 is at nominal value, the transistors 28 and 30 each carry current during approximately half of the time that they are potentially conductive, and the voltage output remains nominal. When the output voltage decreases, as shown in FIGS. 10B–14B, the signal 58 becomes more negative, more of the sawtooth voltage 50 lies above the signal 58, each of the transistors 28 and 30 remain on for a longer period of time and remain off for a shorter period of time, and hence the output voltage is caused to rise. As shown in FIGS. 10C–14C, when the output voltage rises the signal 58 rises, less of the sawtooth voltage 50 lies above the signal 58, the transistors 28 and 30 are on for a shorter period of time and off for a longer period of time, and the output voltage is thus caused to decrease.

POWER CIRCUITRY

Figure 3:
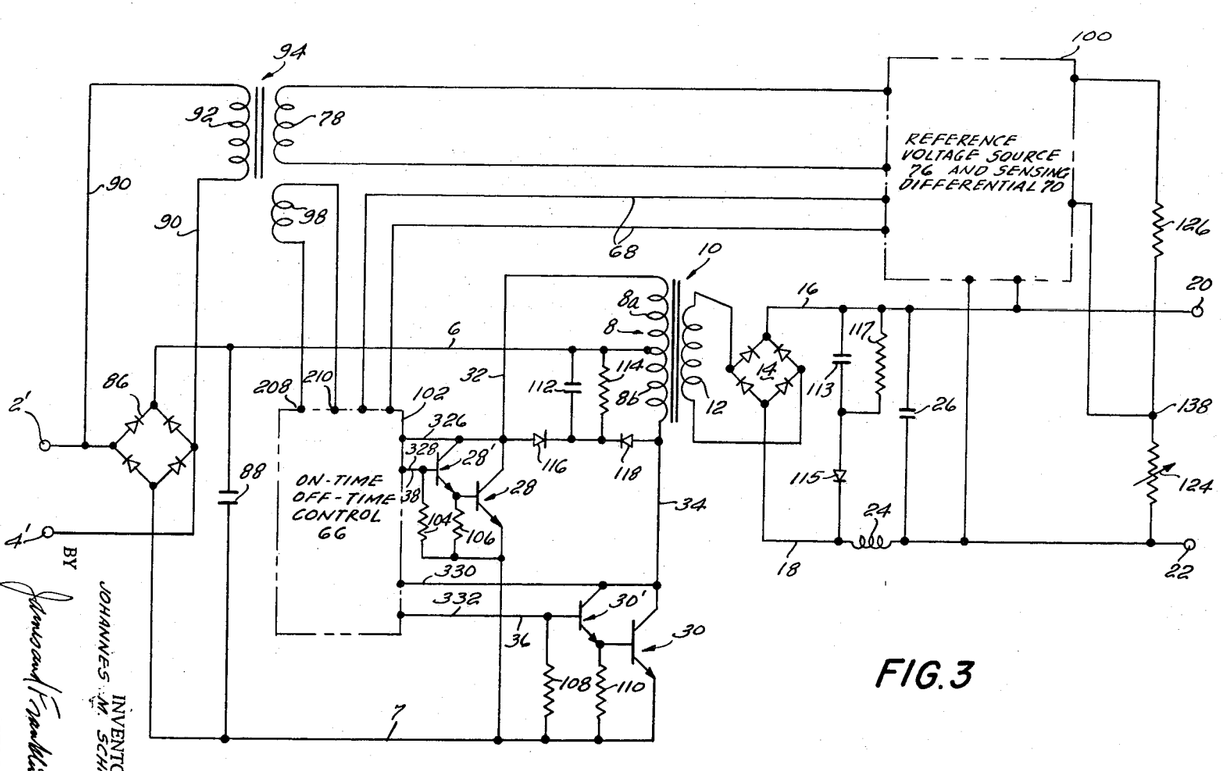
FIG. 3 is a detailed circuit diagram of the power-handling portion of the system of the embodiment of FIG. 1, the sensing and control circuitry being shown in block diagram form.

FIG. 3 is a detailed circuit drawing of the power handling and control portions of the circuitry of FIG. 1. It differs from FIG. 1 in disclosing an AC input across the input terminals 2', 4', which AC input is rectified by full wave rectifier bridge 86 and smoothed by shunt capacitor 88 before being fed to the leads 6 and 7 respectively. The AC input, which may be at the usual power voltage of 110 volts, is also fed by leads 90 to primary winding 92 of transformer 94, that transformer having a pair of secondary windings 78 and 98, the winding 78 feeding circuitry within the block 100, which represents the reference voltage source 76 and the sensing differential 70. The winding 98 provides a biasing voltage for the control circuitry located within block 102 which represents the on-time, off-time control 66. The power handling switching transistors 28 and 30 are joined with parallel connected transistors 28' and 30' respectively, the resistors 104, 106, 108 and 110 being provided to compensate for leakage currents. Capacitor 112 and resistor 114 are connected in parallel with the primary winding sections 8a and 8b and rectifiers 116 and 118 are connected as shown, all in order to suppress voltage spikes and prevent them from appearing in the primary winding sections 8a and 8b. Capacitor 113 and rectifier 115 are connected in series across the output lines 16 and 18, with resistor 117 in shunt with capacitor 113, thereby also to function as a spike suppression circuit.

OUTPUT PARAMETER SENSING

Figure 5:
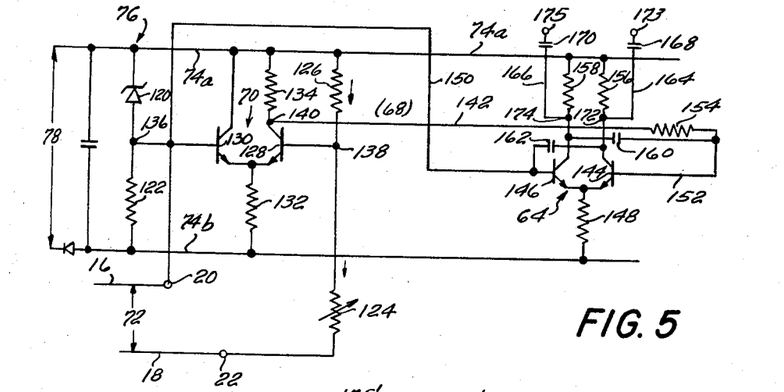
FIG. 5 is a circuit diagram of the sensing differential and oscillator-transducer circuitry of the embodiment of FIG. 1.

FIG. 5 is a circuit diagram of the reference voltage source 76, the sensing differential 70, and the oscillator-transducer 64 of the embodiment of FIG. 1. The input voltage from the winding 78 is rectified and applied across Zener diode 120 and resistor 122 connected in series. The voltage sensing input 72 is derived from output lines 16 and 18, resistors 124 and 126 being connected in series between the negative output line 18 and line 74a, the latter representing a reference positive value. The resistor 124 is adjustable in order to vary the selected voltage parameter which is effective for regulation purposes. The sensing differential 70 is defined by a pair of transistors 128 and 130 whose emitters are connected to one another and, via resistor 132, to line 74b, and whose collectors are connected to line 74a with resistor 134 in series with the collector of transistor 128. The base of transistor 130 is connected to reference voltage point 136 between the Zener diode 120 and resistor 122. The base of transistor 128 is connected to point 138 between the resistors 124 and 126. When points 136 and 138 are at the same potential, the currents through transistors 128 and 130 are equally shared. If the voltage at point 138 should exceed that at point 136, as will be the case when the output voltage is less than desired, transistor 128 will carry more current than transistor 130. Conversely, if the voltage at point 138 is less than the voltage at point 136, as will be the case when the output voltage is greater than desired, transistor 130 will carry more than transistor 128. Variation in the amount of current carried by transistor 128 will result in variation of the voltage at point 140, between the lower end of resistor 134 and collector of transistor 128. The voltage at this point (which is the output 68) will be carried by lead 142 and represents a comparison between the reference voltage at point 136 and a particular desired output voltage for the system across the lines 16 and 18, which output voltage is selected through appropraite setting of the resistor 124.

Figure 8A:
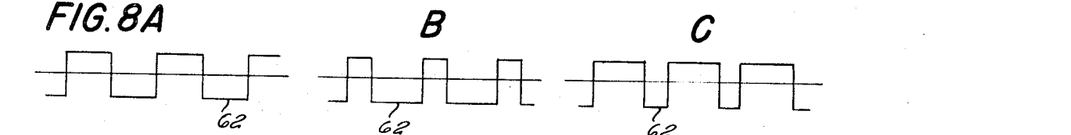
FIGS. 8–14 are schematic graphical representations of the operation of different parts of the system of FIG. 1 under conditions of nominal voltage output, reduced voltage output and increased voltage output respectively, those three conditions being shown in the columns headed A, B, C respectively, FIG. 8 representing the output of the oscillator-transducer, FIG. 9 representing the voltage input within the voltage control circuit, FIG. 10 illustrating the comparison in the level selection circuit of the signal of FIG. 9 and the output of the sawtooth oscillator, FIG. 11 representing the current through one switching transistor, FIG. 12 representing the current through the other switching transistor, FIG. 13 representing a composite of FIGS. 11 and 12, and hence representing the current in the secondary winding of the transformer, and FIG. 14 representing the DC voltage output from the system.

The oscillator transducer circuit 64 is constituted by a multi-vibrator circuit defined by transistors 144 and 146 the emitters of which are connected to one another and then connected to the line 74b via resistor 148. The base of transistor 146 is connected by line 150 to reference voltage point 136. The base of transistor 144 is connected by lead 152 and resistor 154 to lead 142, which in turn goes to point 140. The collectors of the transistors 144 and 146 are each connected by resistors 156 and 158 respectively to the positive reference voltage line 74a. The bases of the transistors 144 and 146 are coupled to the collectors of the other transistors respectively by capacitors 160 and 162 respectively. Output leads 164 and 166 extend between coupling capacitors 168 and 170 respectively and points 172 and 174 respectively which are located between the lower ends of resistors 156, 158 and the collectors of transistors 144, 146 respectively. When the bases of both transistors 144 and 146 are at the same potential the output of the multivibrator circuit 64 is symmetrical, as shown in FIG. 8A. When the voltage of the base of transistor 144 differs from that of the base of transistor 146, the output of the circuit 64 will become unsymmetrical, either in the sense of greater negativeness or greater positiveness, as indicated in FIGS. 8B and 8C respectively.

CONTROL CIRCUITS.—Voltage control circuit

Figure 4:
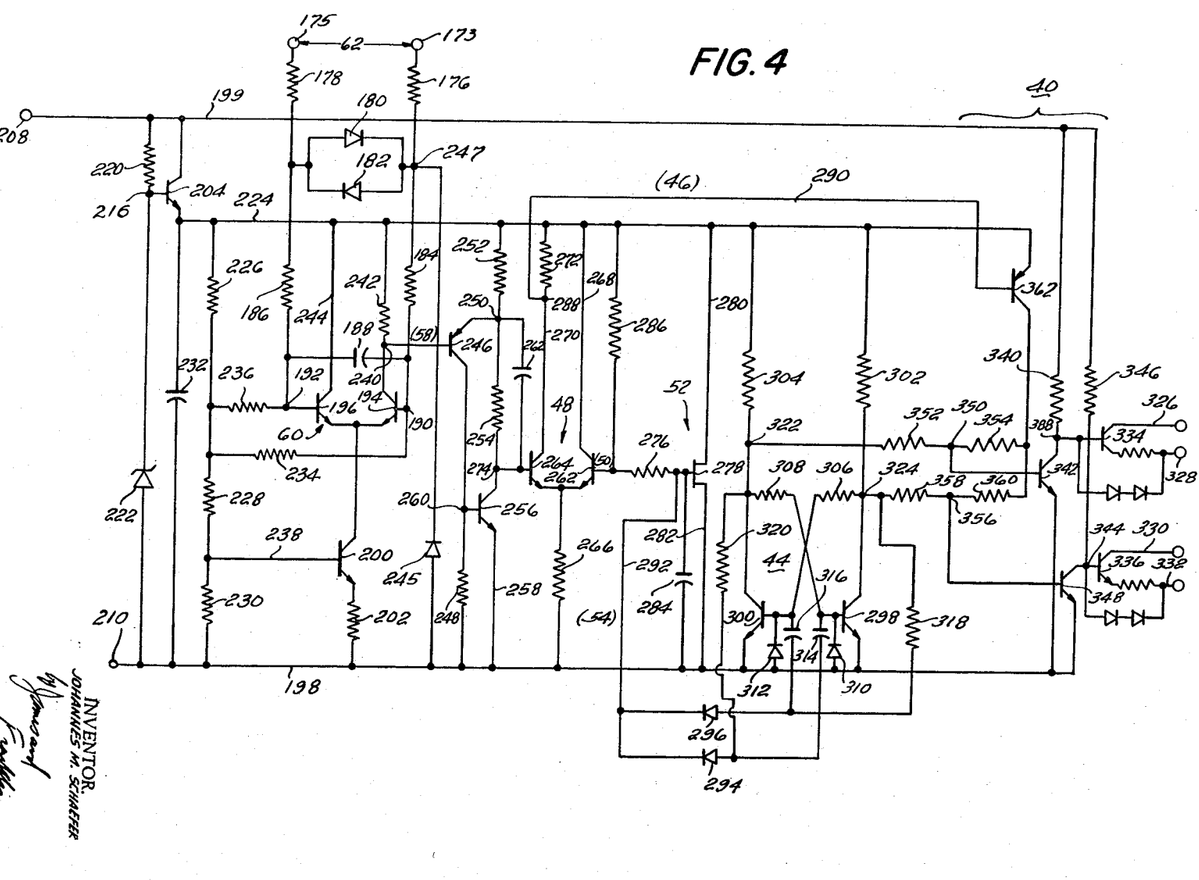
FIG. 4 is a detailed circuit diagram of the voltage control and selection, saw-tooth oscillator, flip-flop and power transistor control circuitry of the embodiment of FIG. 1.
Figure 9:
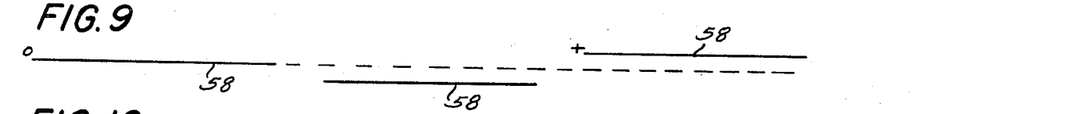

The output from the oscillator transducer 64, fed to points 173 and 175 (see FIGS. 5 and 4), is applied through resistors 176, 178, cross-connected rectifiers 180 and 182, resistors 184 and 186 and shunt capacitor 188 to points 190 and 192. That circuitry converts the square wave output from the oscillator-transducer circuit 64 into a DC signal such as is represented in FIG. 9, the potential difference between points 190 and 192 being essentially zero when the circuit 64 has the symmetrical output wave shape of FIG. 8A and being of finite value and either negative or positive in sense when the output voltage for the circuit 64 is more negative or more positive, as illustrated in FIGS. 8B and 8C respectively. The capacitor 188 and resistors 184 and 186 serve to filter the DC resultant from the rectifiers 180 and 182.

The signal defined between the points 190 and 192 is applied across the voltage control circuit 60 which is defined by transistors 194 and 196 respectively. The emitters of the transistors 194, 196 are connected to one another and then to negative reference voltage line 198 via transistor 200 and resistor 202. Resistor 220 and Zener diode 222 are connected across input terminals 208 and 210 respectively. The base of transistor 204 is connected to point 216 located between resistor 220 and Zener diode 222. This circuitry defines a constant voltage reference supply, making lead 198 (connected to terminal 210) a negative reference line, and making lead 224 (connected to the emitter of transistor 204) a positive reference line. Capacitor 232 is also connected between the lines 198 and 224 for smoothing purposes, and particularly to eliminate current surges. Resistors 226, 228 and 230 are connected in series with one another between lines 224 and 198. The bases of the transistors 194 and 196 are connected by means of resistors 234 and 236 respectively to a point between the resistors 226 and 228. The base of transistor 200 is connected by lead 238 to a point between the resistors 228 and 230. The transistor 200 acts as a constant current source for the transistors 194 and 196, permitting those transistors to float in the circuit. The voltages applied at points 190 and 192, as determined by the output of the oscillator-transducer circuit 64, will determine the sharing of current between the transistors 194 and 196, and therefore will cause changes in the voltage at point 240 between the collector of transistor 194 and the resistor 242 which connects that collector to the line 224. The collector of transistor 196 is connected directly to the line 224 via lead 244. A rectifier 245 connected between line 198 and a point 247 between resistors 176 and 184 protects the base-to-emitter junctions of transistors 134 and 136 against excessive reverse voltage.

Transistor 246 has its base connected to point 240, its collector connected to line 198 via resistor 248 and its emitter connected to point 250 between resistors 252 and 254, those latter resistors being connected between line 224 and the collector of transistor 256. The emitter of transistor 256 is connected to line 198 by lead 258, and its base is connected to point 260 between the resistor 248 and the collector of transistor 246. A capacitor 262 is connected in shunt with the resistor 254. This circuitry provides for amplification of the voltage sensed at point 240.

*Level selection and sawtooth oscillator circuits*

The level selection circuit 48 is defined by transistors 262 and 264 whose emitters are connected to one another and then via resistor 266 to the line 198. Their collectors are connected to the line 224 via leads 268 and 270 respectively, with resistor 272 in series with the collector of transistor 264. The base of transistor 264 is connected to point 274 between resistor 254 and the collector of transistor 256. Its potential is therefore determined by the voltage at point 240 which, as we have seen, constitutes the output 58 of the voltage control circuit 60. The base of transistor 262 is connected by resistor 276 to the base of unijunction transistor 278, the other two terminals of which are connected by leads 280 and 282 to lines 224 and 198 respectively. Capacitor 284 is connected between line 198 and the base of transistor 278. A resistor 286 is connected between line 224 and the left hand end of resistor 276. This circuitry defines the sawtooth oscillator circuit 52, a relaxation oscillator operating at fixed frequency. Thus the voltage of the base of transistor 262 is determined by the sawtooth voltage output 50 of the circuit 52.

The level selection circuit 48 functions as follows: When the base of transistor 264 is at a higher potential than the base of transistor 262, which will be the case when the signal 58 is greater than the sawtooth voltage 50, transistor 264 will conduct and transistor 262 will not conduct. When the base of transistor 262 is more positive than the base of transistor 264, as will be the case when the sawtooth voltage signal 50 is greater than the signal 58, transistor 262 will conduct and transistor 264 will not conduct. The output 46 from the level selection circuit 48 is developed at point 288, between the collector of transistor 264 and the lower end of resistor 272, and is carried by lead 290.

*Flip-flop circuit*

The sawtooth voltage output, designated 54 in FIG. 1, is carried by lead 292 and rectifiers 294 and 296 to the flip-flop circuit 44. That circuit is defined by transistors 298 and 300 whose emitters are connected to line 198 and whose collectors are connected to line 224 via resistors 302 and 304 respectively. The collector of each transistor is connected to the base of the other transistor via resistors 306 and 308 respectively. The bases of each transistor are connected to line 198 via rectifiers 310 and 312 respectively, and those bases are connected to rectifiers 294 and 296 respectively by capacitors 314 and 316 respectively. Resistor 318 connects the collector of transistor 298 to rectifier 296, and resistor 320 connects the collector of transistor 300 to line 198. The flip-flop circuit 44 will operate in either of two statuses, in which either the transistor 298 or the transistor 300 is conductive, thus producing output signals at points 322 or 324 respectively. Each time that the circuit 52 produces a sawtooth signal, the flip-flop circuit 44 will shift from one status to another, providing a signal first at point 322, then at point 324, and so on.

*Power transistor control circuit*

The connections 326, 328 to the power transistors 28 and 28′ and the connections 330 and 332 to the power transistors 30 and 30′ include driver transistors 334 and 336 respectively. The base of driver transistor 334 is connected to point 338 between resistor 340 and bypass transistor 342, the elements 340 and 342 being connected across the lines 198 and 199. The base of driver transistor 336 is connected to point 344 between resistor 346 and bypass transistor 348, those two elements also being connected across lines 198 and 199. When either of the bypass transistor 342 or 348 are conductive, their respective driver transistors 334, 336 are non-conductive, and vice versa.

The base of bypass transistor 342 is connected to point 350 between resistors 352 and 354. The base of bypass transistor 348 is connected to point 356 between resistors 358 and 360. Resistor 352 is connected to point 322. Resistor 358 is connected to point 324. Resistors 354 and 360 are connected to the collector of transistor 362, the emitter of which is connected to line 224 and the base of which is connected to the line 290.

In analyzing the action of the flip-flop circuit 44 and the level selection circuit 48, it should be realized that the power-handling transistors 28, 28′ and 30, 30′ are respectively conductive when current is provided to their respective bases, and they are non-conductive when current is not supplied to their respective bases. Whether current is supplied to their bases or not is determined by the status of the driver transistors 334 and 336; when either of them is conductive base current is supplied to the corresponding power-handling transistors. The status of the driving transistors 334 and 336 is in turn controlled by the bypass transistors 342 and 348 respectively; when the latter transistors are conductive they bypass the bases of the driver transistors 334 and 336 respectively associated with them, thereby depriving those driver transistors of base current and turning them off. When the bypass transistors 342 and 348 are respectively non-conductive, base current is provided to the driver transistors 342 and 348 respectively associated therewith, turning them on. Whether or not the bypass transistors 342 and 348 are conductive is determined by whether or not they have base current, and this is in turn controlled by transistor 362, representing the output of the level selection circuit 48, and by the output from the flip-flop circuit 44.

To simplify the chain of interrelationships, for so long as bypass transistors 342 or 348 are provided with base current the driver transistors 334 and 336 respectively associated with them will be non-conductive, and hence the power-handling transistors 28, 28′ and 30, 30′ respectively associated therewith will be off. Whenever base current is removed from either one of the bypass transistors 342 or 348, the power-handling transistors 28, 28′ and 30, 30′ respectively associated therewith will be on.

When transistor 362 is conductive base current is supplied to both of the bypass transistors 342 and 348, thus ensuring that both sets of power-handling transistors 28, 28′ and 30, 30′ are off. When the flip-flop circuit 44 is in one status base current is applied to one by-pass transistor (e.g. transistor 342) and is not applied to the other by-pass transistor (e.g. 348). When the flip-flop circuit 44 is in its other status, this situation is reversed. Thus, the effect of the flip-flop circuit 44 is to turn off one set of power-handling transistors 28, 28′ or 30, 30′, by supplying base current to its associated bypass transistor 342 or 348, and simultaneously to render the other set of power-handling transistors potentially conductive, its actual non-conductivity or conductivity depending on whether or not base current is supplied to its associated by-pass transistor 342 or 348 by the output of the level sensing circuit 48 acting through the transistor 362. When base current is thus supplied by the transistor 362 the power-handling transistor in question will be off; when base current is not thus supplied, that power-handling transistor will be on. Thus, the precise time, during each period of potential conductivity as determined by the status of the flip-flop circuit 44, when a given set of power-handling transistors 28, 28′ or 30, 30′ will be on or off is determined by the precise time when the transistor 362 is non-conductive and conductive respectively, and this in turn is determined by the comparison between the output parameter signal 58 and the sawtooth voltage signal 50 in the level selection circuit 48; when the signal 58 exceeds the signal 50, the transistor 362 will be conductive, and hence will turn off whichever one of the power-handling transistors 28 or 30 is then potentially conductive. When the signal 58 is less than the signal 50 the transistor 362 will not be conductive, and during that time the potentially conductive power-handling transistor 28 or 30 will be on.

WITH PASSING STAGE

Figures 6, 7:
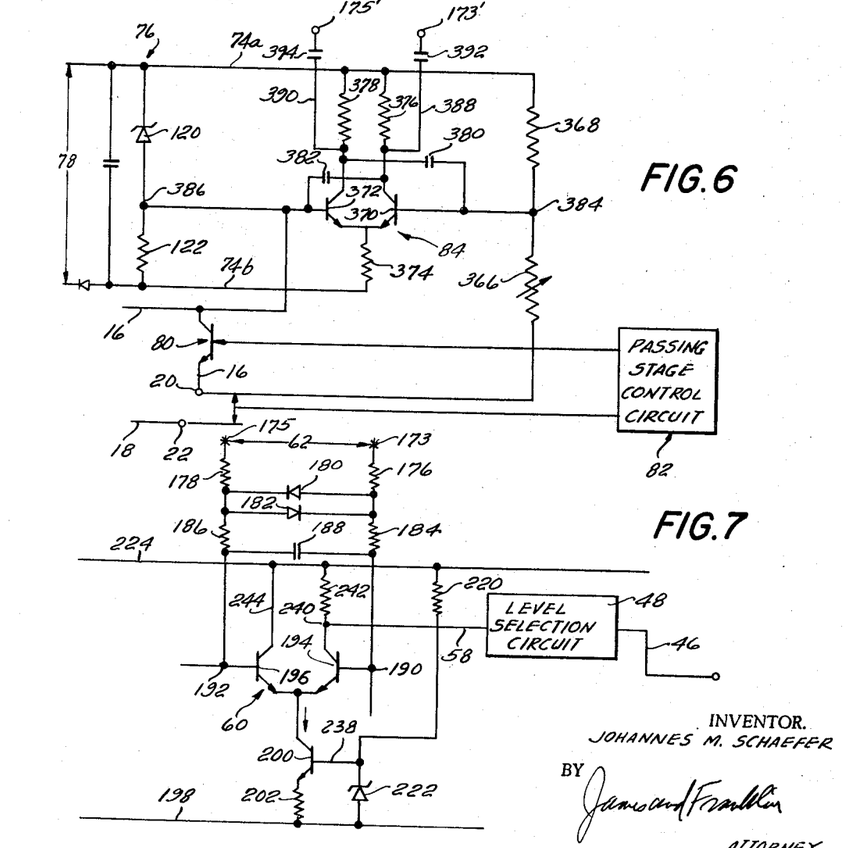
FIG. 6 is a circuit diagram of the sensing oscillator and passing stage control circuit of the embodiment of FIG. 2.
FIG. 7 is a circuit diagram of the voltage control circuit of the embodiment of FIG. 1.

When, as is shown in FIG. 2, some of the output voltage control is achieved by the passing transistor 80, the sensing and control circuitry may be simplified. As illustrated in FIG. 6, the voltage reference source 76 is, similarly to the embodiment of FIG. 5, defined by a Zener diode 120 and a resistor 122 connected across the lines 74a and 74b, line 74a representing a positive reference voltage value. Connected between the line 74a and the output line 16, after the passing transistor 80, is a voltage divider circuit comprising resistors 366 and 368, the former being adjustable. The sensing oscillator 84 is defined by a pair of transistors 370 and 372 the emitters of which are connected to one another and, via resistor 374, to line 74b. The collectors of the transistors 370 and 372 are connected to line 74a via resistors 376 and 378 respectively. Capacitors 380 and 382 connect the bases of the transistors 370 and 372 to the collectors of the others of those transistors. The base of transistor 370 is connected to point 384 between the resistors 366 and 368, while the base of transistor 372 is connected to reference point 386 between Zener diode 120 and resistor 122. Hence the base of transistor 372 is maintained at a reference potential, and the base of transistor 370 is maintained at a potential determined by the voltage across the passing stage. The output from the sensing oscillator 84 is fed by leads 388 and 390 to capacitors 392 and 394, and from there to points 173′ and 175′, which correspond to the points 173 and 175 in the circuitry of FIG. 5. It will be seen that with the passing stage in the system, the sensing differential circuit 70 has been eliminated, the circuit 84 being similar to the oscillator-transducer circuit 64 but functioning by directly measuring the error of the voltage across the passing stage instead of having the error of the output voltage measured by the sensing differential 70. This simplification of the control circuitry, in the embodiment of FIGS. 2 and 6, is permissible because of the extra accuracy produced by the passing transistor 80 and its associated control circuit 82.

DISCUSSION

With this circuitry there is effective isolation between the output parameter error signal sensed at the output end of the circuit (beyond the secondary of the transformer 10) and the input end of the circuit (before the primary side of the transformer 10), which is necessary if no input transformer is used, but if isolation is demanded between the input line and the power output. Since the DC voltage input is inverted, design of the transformer 10 permits the production of an output voltage which may differ radically from the input voltage. The frequency of the cyclic on-off switching of the transistors 28 and 30 is selected, through design of the sawtooth oscillator circuit 42, to provide for optimum operating characteristics of the control system, and is entirely independent of power frequencies at which an AC voltage input, subsequently rectified, may be provided. More specifically, the inversion frequency may be in the kilocycle per second range. As a result the transformer 10 is operated at such high frequencies that its weight, size and cost will all be minimized.

The power transistors 28 and 30 do not limit the output of the system to any appreciable extent. The transistors 28 and 30 are operated at line voltages, so that output voltages of considerably higher magnitude may be employed without adversely affecting the power transistors. Similarly, when we have a low voltage, high current output (for example, converting 100 volts at 5 amps to 5 volts at 100 amps), the power handling transistors 28 and 30 are operated at the lower amperage, thus minimizing the amount of heat produced therein and therefore not presenting any substantial heat dissipation problem.

While the disclosure has been here specifically in terms of voltage control, it will be apparent that other parameters, such as current, could be measured and controlled, either instead of or in addition to the voltage, all in fashions well known in the art.

Although a limited number of embodiments have been here specifically disclosed, it will be apparent that many variations may be made therein, all within the scope of the present invention as defined in the following claims.

I claim:

1. A voltage control system comprising an input circuit comprising a pair of parallel branches each comprising a winding and a switch means in series, a transformer comprising a primary defined at least in part by said windings and a secondary coupled to said primary, an output circuit connected to said secondary, and means for selectively controlling said switch means in recurrent cycles sequentially as follows: (a) one switch on and the other switch off, (b) both switches off, and (c) said one switch off and said other switch on, and means for varying the time duration of (b) relative to (a) and (c) within a given cycle, thereby to vary the voltage output, said switch controlling means and said time duration varying means comprising means for generating a recurrent voltage substantially of sawtooth-shape at a given frequency, flip-flop circuit means operatively connected between said sawtooth-voltage means and said switches, the status of said flip-flop circuit means being determined by said sawtooth-voltage means and said flip-flop circuit being effective to render one of said switches potentially on and the other off or vice versa, depending on the status of said flip-flop circuit means, variable timing means connected to said sawtooth voltage means and to said system output, effective to compare the output voltage with said sawtooth-voltage, and to produce a switching signal in response thereto, and means for operatively connecting said switching signal to which ever one of said switches is potentially on and effective to render it actually on, thereby to decrease the time within each cycle that said potentially active switch is on as the output voltage increases.

2. The system of claim 1, in which said switch means consists of transistors.

3. The system of claim 1, in which said switch means comprises power transistors having control electrodes, control transistors operatively connected to said control electrodes of said power transistors so as, when conductive and non-conductive respectively, to render said power transistors non-conductive and conductive respectively, said means operatively connecting said flip-flop circuit means to said switches comprising means connected between said flip-flop circuit means and said control transistors and effective to render one or the other of said control transistors conductive depending upon the status of said flip-flop circuit means, thereby rendering the corresponding power transistor non-conductive and the other power transistor potentially conductive, said means for operatively connecting said switching signal to said switches comprising means connected between said switching signal and said control transistors and effective or ineffective to render both of said control transistors conductive depending on whether said switching signal is inoperative or operative to turn the potentially active switch on, the rendering of both said control transistors conductive rendering both of said power transistors non-conductive, the failure to render both of said control transistors conductive turning on that one of said power transistors rendered potentially conductive by said flip-flop circuit means.

4. The system of claim 3, in which said means connecting said control transistors to said flip-flop circuit means and said switching signal respectively comprise transistors.

5. A timing system comprising a pair of switches, timed means operatively connected to said switches for alternatingly rendering one potentially active and the other inactive, and vice versa, at a given cycle frequency, and variable means operatively connected to said switches for determining when within each half cycle the potentially active switch turns on and off, said timed means comprising means for generating a recurrent voltage substantially of sawtooth shape at said given frequency, and flip-flop circuit means operatively connected between said sawtooth voltage means and said switches, the status of said flip-flop circuit means being determined by said sawtooth-voltage means and said flip-flop circuit being effective to control the inactivity and potential activity of said switches respectively, depending on the status of said flip-flop circuit means, means having inputs from said sawtooth voltage means and from an external signal and being effective to compare said external signal with said sawtooth voltage and to produce a switching signal in response thereto, and means for operatively connecting said switching signal to whichever one of said switches is potentially active, thereby to provide on-off control for said potentially active switch within each half cycle.

6. The system of claim 2, in which said switches consist of transistors.

7. The system of claim 5, in which said switches comprise power transistors having control electrodes, control transistors operatively connected to said control electrodes of said power transistors so as, when conductive and non-conductive respectively, to render said power transistors non-conductive and conductive respectively, said means operatively connecting said flip-flop circuit means to said switches comprising means connected between said flip-flop circuit means and said control transistors and effective to render one or the other of said control transistors conductive depending upon the status of said flip-flop circuit means, thereby rendering the corresponding power transistor non-conductive and the other power transistor potentially conductive, said means for operatively connecting said switching signal to said switches comprising means connected between said switching signals and said control transistors and effective or ineffective to render both of said control transistors conductive depending on whether said switching signal is inoperative or operative to turn the potentially active switch on, the rendering of both said control transistors conductive rendering both of said power transistors non-conductive, the failure to render both of said control transistors conductive turning on that one of said power transistors rendered potentially conductive by said flip-flop circuit means.

8. The system of claim 7, in which said means connecting said control transistors to said flip-flop circuit means and said switching signal respectively comprise transistors.

References Cited

UNITED STATES PATENTS

| | | | |
|---|---|---|---|
| 2,987,665 | 6/1961 | Thompson | 321—2 XR |
| 3,185,912 | 5/1965 | Smith et al. | 321—18 |
| 3,197,691 | 7/1965 | Gilbert | 321—18 |
| 3,219,906 | 11/1965 | Keller et al. | 321—18 XR |
| 3,219,907 | 11/1965 | Josephson | 321—18 |
| 3,324,377 | 6/1967 | Mills | 321—45 XR |
| 3,325,716 | 6/1967 | Gomi | 321—18 XR |
| 3,334,292 | 8/1967 | King et al. | 321—45 |
| 3,341,765 | 9/1967 | Rogers et al. | 321—18 XR |

LEE T. HIX, *Primary Examiner.*

W. M. SHOOP, *Assistant Examiner.*